United States Patent [19]

Hufford

[11] Patent Number: 5,269,486
[45] Date of Patent: Dec. 14, 1993

[54] CLAMP SUPPORT FOR SENSOR MOUNTS

[76] Inventor: Donald L. Hufford, 11741 Villa Rd., Charlevoix, Mich. 49720

[21] Appl. No.: 947,426

[22] Filed: Sep. 18, 1992

[51] Int. Cl.$^5$ ............................................. E04G 5/00
[52] U.S. Cl. ............................ 248/231.6; 248/74.1; 248/74.4; 403/173
[58] Field of Search ............... 248/65, 67.7, 74.1, 248/74.4, 225.01, 231.6; 403/101, 110, 173–175

[56] References Cited

U.S. PATENT DOCUMENTS

| | | | |
|---|---|---|---|
| 1,045,583 | 11/1912 | Mills | 403/110 |
| 1,416,386 | 5/1922 | Selah . | |
| 1,803,508 | 5/1931 | Rossman . | |
| 1,835,339 | 12/1931 | Rossman . | |
| 1,867,107 | 7/1932 | Schmidt, Jr. . | |
| 2,037,980 | 4/1936 | Heartz | 304/40 |
| 2,219,655 | 10/1940 | Markey | 248/74.1 |
| 2,461,762 | 2/1949 | O'Donnell | 403/173 X |
| 2,583,368 | 1/1952 | French | 304/40 |
| 2,651,804 | 9/1953 | Wilkin | 403/174 X |
| 3,092,407 | 6/1963 | Blonder | 287/54 |
| 4,702,448 | 10/1987 | LoJacono et al. | 248/231.7 |

FOREIGN PATENT DOCUMENTS 757171  12/1933  France ..................... 248/226

OTHER PUBLICATIONS

CPI Publication, CPI Clamp Blocks.
Automation Products Group, Double Boom Mount.

*Primary Examiner*—Douglas D. Watts
*Attorney, Agent, or Firm*—Price, Heneveld, Cooper, DeWitt & Litton

[57] ABSTRACT

A mounting clamp and assembly in which the clamp's intermediate web extends across the support member at an oblique angle. A pair of side rails are adjustably coupled to the support boom, each side rail having a separate clamp for independent adjustment with the side rails being diametrically opposed. Each clamp has a raised contact surface on one side to permit the clamp to remain fixed on the support boom while the side rail is adjusted.

8 Claims, 2 Drawing Sheets

CLAMP SUPPORT FOR SENSOR MOUNTS

BACKGROUND OF THE INVENTION

The present invention relates to couplings and clamps, and has particular usefulness in relation to mounting assemblies for sensors and instrumentation.

Heretofore, a wide variety of couplings and mounting clamps have been used to join rigid members at different angles, such as are used in the coupling of cross-bars and supports, scaffolding members, and the like. A number of existing coupling constructions utilize a clamp element that clamps about a main support bar, with a side rail or rails also connected to the clamp. While many clamps provide for the right-angle connection of two members or rails, in some of these prior couplings the clamp is connected to the side rail in a manner which permits the side rail to extend at an oblique angle to the main support. Such an obliquely extending connection would be used in the mounting of a diagonal brace on a scaffolding or the like. Further, in some prior couplings, the side rail is provided with an ear or lobe on one end that extends off from the central axis of the side rail, in order to offset the cross-rail from the clamp body that extends across the clamped member. With two such side rails and adjacent clamps, this offset arrangement permits two side arms to be mounted in diametric opposition on a single main support beam or member.

One drawback of certain prior coupling assemblies has been the provision of a highly adjustable assembly that provides a rigid coupling when assembled, but which does not provide for the mounting of diametrically opposed side rails. For example, in assemblies having a single clamp that extends across the support beam to mount two diametrically opposed side rails, adjustment of one side rail involves the releasing of both side rails. In such an assembly, a single side rail can, therefore, not be adjusted without simultaneous adjustment of the opposing rail. In other assemblies that use a separate clamp element for each side rail, most mounting assemblies do not provide for the diametrically opposed positioning of the side rails. Those assemblies which use offsetting ears or tabs to offset the side rail result in a moment arm or lever being created between the side rail and the clamp element. As a result, when weight is applied to the side rail, not only is there a longitudinal flexing of the side rail, but a rotational torque is created by the moment arm about the clamp element. In assemblies that require close tolerances, or in assemblies in which a vacuum cup is used to lift or position heavy objects with associated large stresses being exerted on the clamp, this additional factor must be accommodated either by adjusting the positioning of the side rail, or by increasing the size, weight, or type of material used in the mounting elements in order to provide a sufficiently rigid mounting assembly.

SUMMARY OF THE INVENTION

The present invention is embodied in a clamp structure and assembly that joins side members or rails to a main support member. The clamp has two ends and an intermediate web that extends about and clamps onto the main support member. The intermediate web extends across the main support element at an oblique angle to the axis of the main support element. The ends of the clamp are, therefore, longitudinally offset along the axis of the central support member. With two clamps adjacently mounted on the main support member, two diametrically opposed side rails can be mounted on the support element. Even though the two clamps provide an offset arrangement, each side rail extends straight from the end of the clamp by which that side rail is coupled. Preferably, the end of the clamp to which the cross-rail is joined includes raised, facing contact surfaces on one side to provide the clamp with the ability to clamp into position on the main support beam while still providing adjustment to the side rail.

The clamp assembly utilizing the angled clamps of the present invention is particularly suited to coupling side rails to a main support member or boom for the mounting of sensors, vacuum cups, or other instrumentation on the cross-rails. Each opposing cross-rail may be loosened and adjusted in order to accommodate the particular instrument's use and tolerance requirements without releasing the opposing side rail and its associated instrumentation. Moreover, although two directly opposing cross-rails may be mounted to the main support or boom, a moment arm is not produced between each side rail and its associated coupling end of the clamp element.

These and other features, objects, and benefits of the invention will be recognized by those skilled in the art from the specification and claims which follow and the drawings attached hereto.

DETAILED DESCRIPTION OF THE PREFERRED EMBODIMENTS

Figure 1:
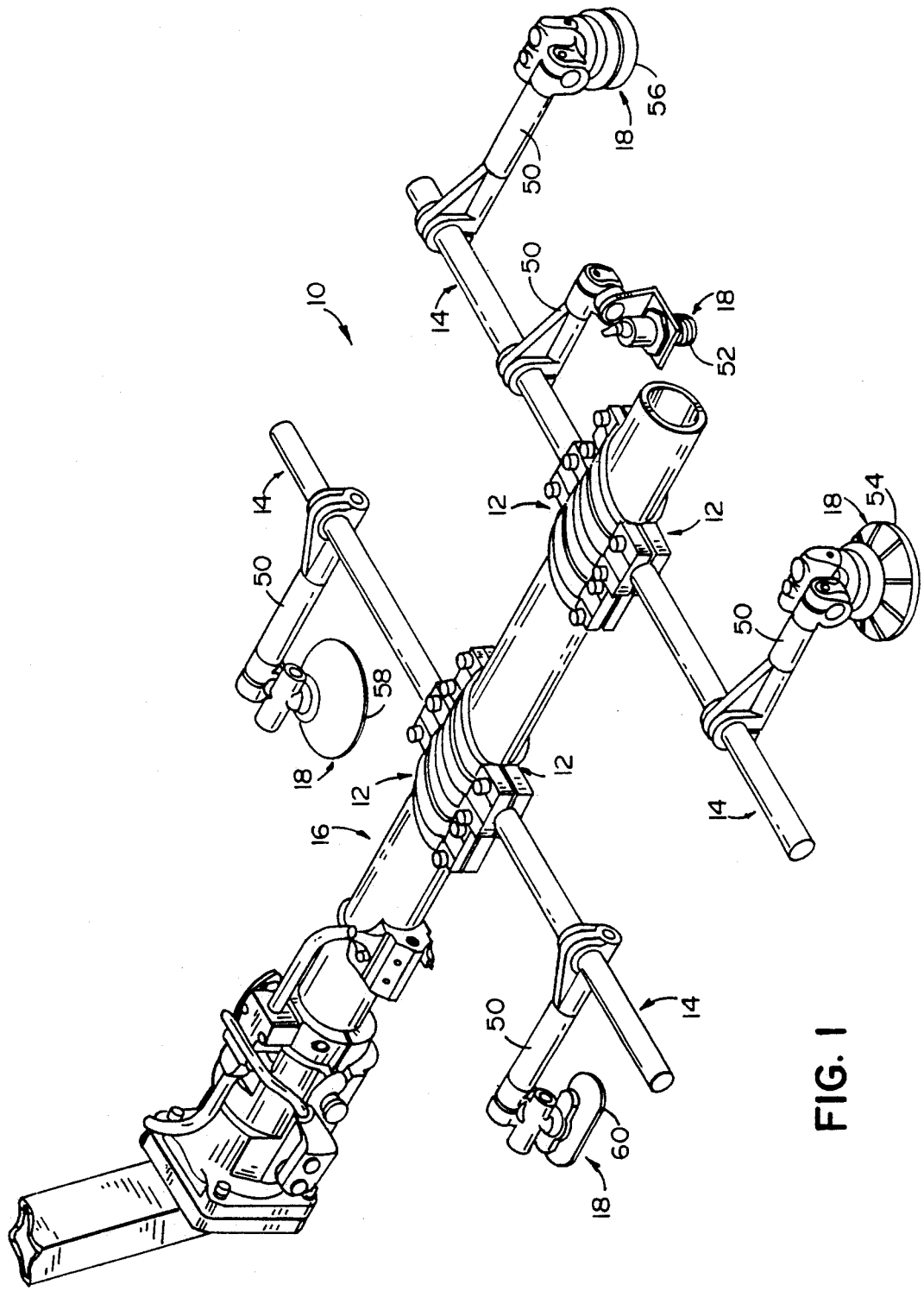
FIG. 1 is an oblique view of a sensor mounting assembly embodying the present invention.

The present invention is shown in preferred form in FIG. 1 and referenced generally by numeral 10. In the preferred form shown in FIG. 1, mounting assembly 10 includes at least one complementary pair of clamps 12. Each clamp 12 couples a side rail 14 to a single central support boom 16. A series of instruments 18 are mounted by side rails 14 to support boom 16.

Figure 2:
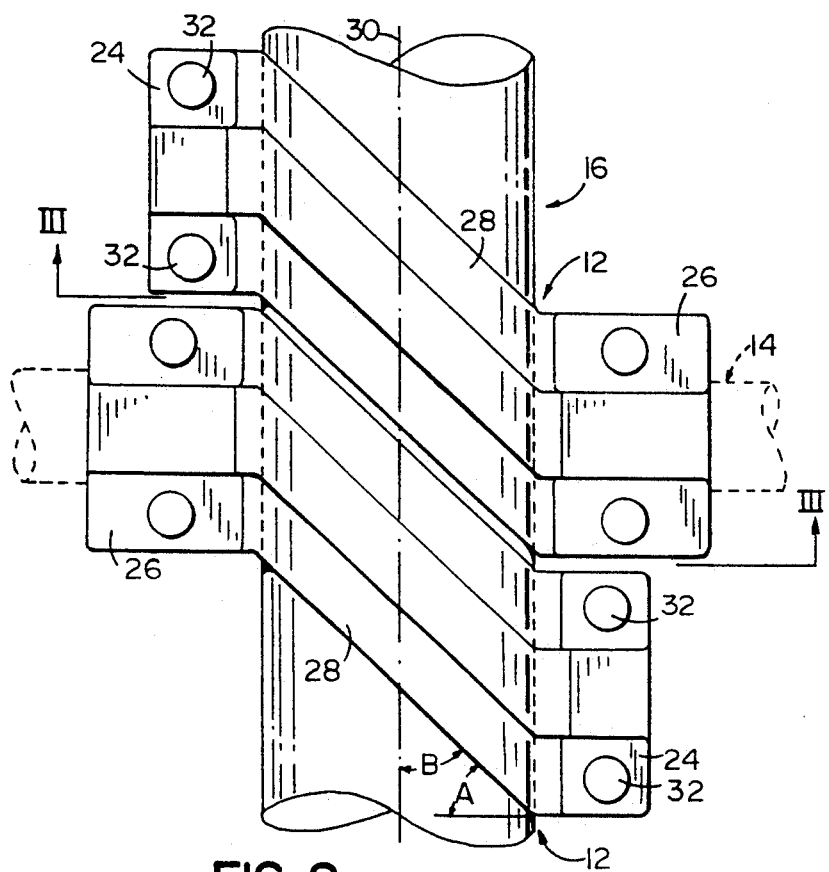
FIG. 2 is a plan view of a pair of adjacent clamp elements on the main support boom of the assembly shown in FIG. 1.
Figure 3:
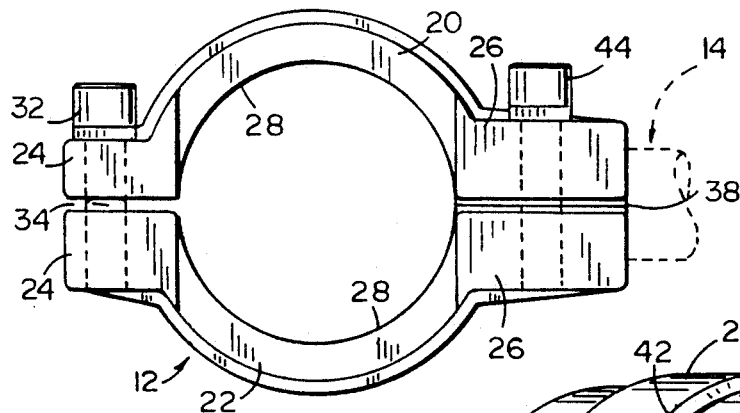
FIG. 3 is an end elevational view of one of the clamp elements shown in FIG. 2 and taken along plane III—III.
Figure 4:
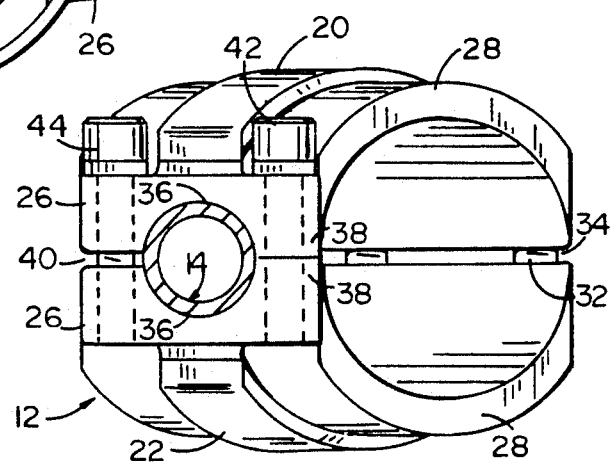
FIG. 4 is a side elevational view of the clamp element shown in FIG. 3.

As shown in FIGS. 3 and 4, each clamp 12 has an upper clamp block 20 which mates with a complementary lower clamp block 22. As designated herein, "upper" and "lower" refer to the orientation shown in FIGS. 3 and 4, although clamps 12 may be oriented so that clamp blocks 20, 22 are positioned horizontally adjacent or otherwise rotated about support boom 16. As shown in FIGS. 2 and 3, each clamp block 20, 22 includes a clamping or joining end 24, a mounting end 26, and an intermediate clamping web 28 extending integrally between ends 24 and 26.

Support boom 16 has a longitudinal axis 30 (FIG. 2). Most preferably, support boom 16 has a circular cross-section with an outside diameter of about two and one-half inches, although other dimensions may be adapted to particular applications of assembly 10. Intermediate clamping webs 28 of clamp 12 extend about the perimeter of support boom 16, but extend at an oblique angle to longitudinal axis 30. Preferably, intermediate clamping webs 28 are arcuate and have an inner surface roughly corresponding to the outer diameter of support boom 16, and most preferably are radiused at one and one-fourth inch, and have a raised reinforcement rib on the outer surface. Alternatively, boom 16 may have a rectangular or oblong cross-section with webs 18 having correspondingly mating inner surfaces and dimensions to accommodate boom 16. Such configurations may, however, reduce the adjustability of clamp 12 about the perimeter of boom 16. Joining ends 24 and mounting ends 26 project normal to longitudinal axis 30 of boom 16. Joining ends 24 and mounting ends 26 of each clamp 12 preferably each extend, therefore, on an opposite radius of support boom 16, but are also offset along longitudinal axis 30 by the oblique angle of intermediate webs 28. Most preferably for a support boom 16 two and one-half inches in diameter, each clamping web 28 extends about 2.13 inches along longitudinal axis 30 and at an oblique angle "A" (FIG. 2) of about forty-two degrees across support boom 16, so that web 28 is oriented at an oblique angle "B" of about forty-eight degrees relative to boom longitudinal axis 30.

Each joining end 24 is a generally rectangular tab that is adjustably clamped by bolts 32. Intermediate clamping webs 28 space joining ends 24 slightly so as to form a small tightening gap 34 between opposed joining ends 24 (FIG. 3). Each mounting end 26 is a roughly rectangular tab that protrudes laterally from support boom 16 a slightly greater distance than joining ends 24. Most preferably, joining ends 24 protrude about one inch from support boom 16, while mounting ends 26 protrude about one and one-half inch from support boom 16. This slightly larger dimension of mounting ends 26 accommodates a rigid seating of side rail 14. Each mounting end 26 includes a curved seat 36 (FIG. 4) that is dimensioned and curved to snugly accommodate side rail 14. Most preferably, side rails 14 each have an outside diameter of one inch, and curved seats 36 are radiused at one-half inch, but, alternatively, other dimensions and cross-sections could be utilized. As shown in FIG. 4, immediately adjacent curved seats 36 on one side of mounting ends 26 are a pair of flattened, facing contact surfaces 38. Laterally adjacent the other side of curved seats 36, no contact surfaces are provided, so that a slight gap 40 (FIG. 4) is formed between the facing surfaces of mounting ends 26 on only one side. Mounting ends 26 are joined by a set bolt 42 and an adjustment bolt 44 (FIG. 4).

Abutting contact surfaces 38 permit clamp 12 to remain fixedly clamped onto support boom 16, while curved seats 36 are loosened. When clamp 12 is positioned on support boom 16, set bolt 42 is tightened until contact surfaces 38 firmly abut. Joining end bolts 32 are tightened to fixedly clamp 12 onto support boom 16. Side rail 14 may be slid between curved seats 36 and rotated within curved seats 36. When side rail 14 is correctly positioned, adjustment bolt 44 is tightened to fix rail 14 in position.

As shown in FIG. 1, side rails 14 mount one or more instrument swivel arms 50. Swivel arms 50 each mount an individual sensor or instrument, which as shown includes a proximity sensor 52, a traction vacuum cup 54, a combined collapsible vacuum cup and proximity sensor 56, a flat foot cup 58, and an oval flat foot cup 60.

As shown in FIGS. 1 and 2, a pair of diametrically opposed side rails 14 are mounted on support boom 16. Although two side rails 14 are mounted in opposition, each individual side rail 14 may be adjusted by loosening and repositioning the associated clamp 12. Since different sensors, probes, or instruments may be carried on each opposing side rail, the tolerance or clearance of each side rail may require independent adjustment during operation. Although two clamps 12 are shown positioned in opposing directions in FIG. 2, the two clamps 12 are identical to each other, with one of the clamps 12 being turned one hundred eighty degrees from the other clamp.

Although in the preferred embodiment mounting ends 26 extend laterally normal to longitudinal axis 30, mounting ends 26 may also extend at an oblique angle to longitudinal axis 30. In such an embodiment, side rail 14 will extend at an oblique angle to support boom 16, yet no moment arm is formed between the end of side rail 14 and mounting ends 36.

It will be understood by one skilled in the art that various modifications and improvements may be made without departing from the spirit of the concept disclosed herein. The scope of protection afforded is to be determined by the claims which follow and the breadth of interpretation which the law allows.

The embodiments of the invention in which an exclusive property or privilege is claimed are defined as follows:

1. An instrument and vacuum cup support boom coupling assembly, comprising:
    a boom member having a longitudinal axis and an outer circumference;
    at least one side member with a sensor mounted thereon;
    a coupling adjustably coupling said side member to said boom, said coupling comprising a pair of coupling blocks, said coupling blocks having first ends with a first adjustable fastener extending therebetween, said coupling blocks having second ends with facing mounting surfaces adapted to clampingly mount said side member therebetween and a second adjustable fastener extending between said second ends, and said coupling blocks having intermediate clamp sections extending about said boom outer circumference at an oblique angle sufficient to offset said first ends from said second ends along said longitudinal axis.

2. An assembly as defined in claim 1, further comprising:
    a pair of longitudinally adjacent couplings mounting a pair of side members on generally opposite sides of said boom.

3. The assembly of claim 2, wherein said side members extend generally normal to said longitudinal axis.

4. The assembly of claim 2, wherein said adjacent couplings are interchangeable with each other.

5. A mounting clamp for coupling generally laterally extending members to a support boom having a longitudinal axis, comprising:
    a pair of mating clamp blocks each having a first joining end and a mounting end connected by an intermediate clamping web, with said joining end and said mounting end spaced and disposed to be located on generally opposite sides of said support boom;
    said joining ends having first means for adjustably coupling said joining ends together, said mounting ends having cooperative mounting surfaces configured to mount one of said generally laterally extending members therebetween and having second means for adjustably coupling said mounting ends together;

said intermediate clamping webs having cooperatively facing clamping surfaces configured to extend across said support boom and clamp said support boom therebetween with said clamping webs extending at an oblique angle to said longitudinal axis so as to longitudinally offset said joining ends from said mounting ends.

6. The mounting clamp of claim 5, wherein:

said clamping webs extend at an angle relative to said longitudinal axis sufficient to longitudinally offset said joining ends from said mounting ends a longitudinal clearance distance that permits another of said mounting clamps to position another of said generally laterally extending members diametrically opposite said one generally laterally extending member.

7. The mounting clamp of claim 6, wherein:

said mounting ends have contact surfaces laterally adjacent said mounting surfaces, said contact surfaces spaced and adapted to contact each other and provide a spacing gap between said mounting ends at the other side of said mounting surfaces.

8. A plurality of mounting clamps as defined in claim 5, each adapted to be mounted adjacent and proximate another of said mounting clamps.

* * * * *